US005080217A

United States Patent [19]

Garlichs et al.

[11] Patent Number: 5,080,217

[45] Date of Patent: Jan. 14, 1992

[54] BOOK BLOCK TRANSPORT CHANNEL

[75] Inventors: Siemen Garlichs, Espelkamp; Karl-Ludwig Rahe, Preussisch Oldendorf; manfred Riesmeier, Rahden, all of Fed. Rep. of Germany

[73] Assignee: Kolbus GmbH & Co. KG, Rahden, Fed. Rep. of Germany

[21] Appl. No.: 679,534

[22] Filed: Apr. 2, 1991

[30] Foreign Application Priority Data

Apr. 14, 1990 [DE] Fed. Rep. of Germany ....... 4012084

[51] Int. Cl.[5] .............................................. B65G 19/18

[52] U.S. Cl. .............................. 198/735.3; 198/836.3; 412/33; 412/37; 271/271

[58] Field of Search ............... 198/735.1, 735.3, 836.3; 412/33, 37; 271/271

[56] References Cited

U.S. PATENT DOCUMENTS

| | | | |
|---|---|---|---|
| 3,171,648 | 3/1965 | Wood . | |
| 3,503,489 | 3/1970 | Selis | 198/733 |
| 3,599,805 | 8/1971 | Spencer et al. . | |
| 3,874,497 | 4/1975 | Carlson | 198/836.3 |
| 4,371,156 | 2/1983 | Pessina et al. | 198/735.3 X |
| 4,674,238 | 6/1987 | Suzuki et al. | 198/735.3 X |

FOREIGN PATENT DOCUMENTS

| | | |
|---|---|---|
| 1556688 | 1/1970 | Fed. Rep. of Germany . |
| 2520518 | 4/1986 | Fed. Rep. of Germany . |
| 2009073 | 10/1978 | United Kingdom . |

*Primary Examiner*—Joseph E. Valenza
*Assistant Examiner*—Tuan N. Nguyen
*Attorney, Agent, or Firm*—Chilton, Alix, & Van Kirk

[57] ABSTRACT

An improved book block transport channel has adjustable lateral guide members, which define the channel width, and an adjustable skid plate with support finger projections outwardly in two opposed directions. The skid plate support fingers are received in slots in the guide members and define a discontinuous channel floor adjacent the guide members. The openings in the channel floor and the slots are partly bridged by guide rails which are mechanically coupled to a respective guide member and to the support fingers which are received in the slots in that guide member.

20 Claims, 1 Drawing Sheet

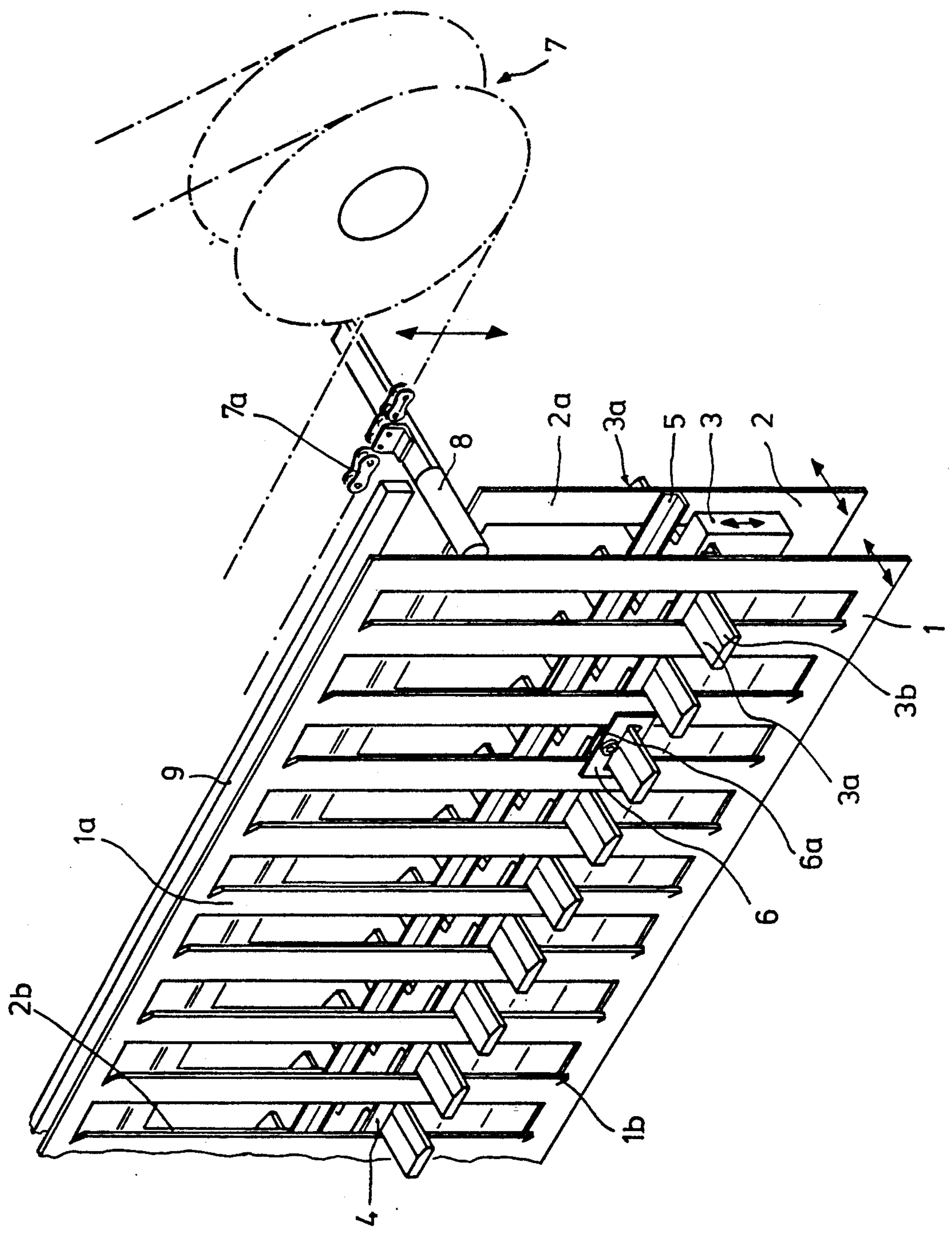
7
7a
8
2a
3a
5
3
2
1
3b
3a
6a
6
9
1a
2b
1b
4

BOOK BLOCK TRANSPORT CHANNEL

BACKGROUND OF THE INVENTION

1. Field of the Invention

The present invention relates to the manufacture of books and particularly to the movement of partially completed books from station-to-station in a bookbinding process. More specifically, this invention is directed to a transport channel which guides book blocks, standing upright and supported laterally, as they are caused to slide along a surface while travelling between work stations. Accordingly, the general objects of the present invention are to provide novel and improved methods and apparatus of such character.

2. Description of the Prior Art

Book block transport channels of the general type to which the present invention is directed are well known in the art and are often employed as entry sections for bookbinding machines. The known transport channels are defined by a pair of lateral guides, which form the channel side walls, and a vertically adjustable book block skid plate, which forms the channel floor. The skid plate is located between the guides and, during movement, the book blocks are caused to slide along the channel, while resting on the skid plate, by pusher elements associated with a conveyor. The distance between the lateral guides of a book block transport channel must be variable to accommodate different book block thicknesses. The requirement of adjustability of the lateral guides, in turn, dictates the need to match the skid plate or plates to the spacing between the guides. In the prior art, the matching of the width of the book block skid plates to the lateral guide spacing has been accomplished by changing the skid plates.

The changing of book block transport channel skid plates results in long machine set-up times because there is no easy access to the plates for the purpose of removal and reinstallation. Long machine set-up and change-over time is becoming increasingly intolerable in the bookbinding art for several reasons. Firstly, the changing of the book block skid plates requires trained personnel, is labor intensive and thus is expensive. Secondly, long set-up time is an impediment to increases in productivity, by increasing book block through-put, while retaining current production techniques. Thirdly, the number of copies of a book produced per print run has been continually declining in recent years thereby requiring more frequent changes in machine set-up. It is also to be noted that the necessity of skid plate replacement requires that a multiplicity of skid plates of varying width be maintained in inventory.

To expand somewhat on the above remarks, a very large number of finely graded book block skid plates are typically required in order to achieve exact matching of the skid plate to the distance between the lateral guides of the book block transport channel, this distance being set to suit the thickness of the book blocks which are to be processed at any given time. In practice, however, cost considerations make it impossible to maintain the requisite large skid plate inventory. Accordingly, gaps often occur between the skid plate and the lateral guides. When thick, unstable book blocks are being processed, the outside portions of such blocks can sag into these gaps, become wedged therein and consequently cause production stoppages or malfunctions. The interference between the outside portions of a book block and the gaps in the transport channel is especially a problem when the conveyor pusher elements contact the book blocks above their center of gravity thus producing a tilting moment.

SUMMARY OF THE INVENTION

The present invention overcomes the above briefly discussed and other deficiencies and disadvantages of the prior art by providing a novel and improved book block transport channel which can be adjusted to accommodate different book block thicknesses with minimum expenditure of time and labor. A book block transport channel in accordance with the present invention, and the transport method which is implemented thereby, minimize the possibility of stoppages or malfunctions during the conveyance of a book block.

In accordance with the invention, the skid plate or plates of a book block transport channel are provided with supporting fingers which project outwardly from both sides thereof. The lateral guides of the transport channel have an open grill-like construction, formed by slats which define parallel vertical slots, and the supporting fingers extend through these slots. The skid plate or plates are vertically adjustable relative to the grill-like lateral guides and the guides are horizontally adjustable to vary the spacing therebetween. A book block transport channel in accordance with the present invention is further provided with a pair of oppositely disposed guide rails which are coupled to the supporting fingers of the skid plates and to the slats of the lateral guides. These guide rails bridge the open areas between the supporting fingers of the guide plates and also bridge the slots in the regions thereof which are adjacent to the support fingers.

BRIEF DESCRIPTION OF THE DRAWING

The present invention may be better understood, and its numerous objects and advantages will become apparent to those skilled in the art, by reference to the accompanying drawing which is a partial perspective view of a book block transport channel in accordance with a first embodiment of the invention.

DESCRIPTION OF THE DISCLOSED EMBODIMENT

With reference now to the drawing, the book block transport channel which has been depicted is designed for use as an entry section for a bookbinding machine. The transport channel includes a book block skid plate 3 located between vertically oriented lateral guides 1 and 2. The guides 1, 2 are configured as open grills defined by individual slats as indicated at 1*a* and 2*a*. The skid plate 3 is provided with pairs of support fingers 3*a* which project outwardly in an aligned, opposed relationship so as to extend through the slots between the slats 1*a*, 2*a* of the vertical guides 1, 2 as shown.

The vertical guides 1, 2 may be moved relative to each other, through the use of known adjusting means which have not been shown, in order to vary the width of the transport channel to thereby accommodate book blocks of different thickness. During the channel width adjustment, the guides 1, 2 move along the supporting fingers 3*a*. The position of the skid plate 3 is also adjustable, through the use of means known in the art, in the direction indicated by the double ended arrow, i.e., in a direction transverse to the direction of adjustment of the lateral guides to vary channel depth. During adjustment of the position of skid plate 3, the fingers 3*a* move along the slots between the slats of the guides 1, 2.

A book block transport channel in accordance with the invention is further provided with a pair of oppositely disposed rails 4, 5 which are generally L-shaped, i.e., the rails are angle-section members. The rails 4, 5 span the gaps between the supporting fingers 3*a* of the skid plate 3 and extend upwardly so as to also span the gaps between the slats 1*a*, 2*a* in the regions which are immediately adjacent to the fingers 3*a*. The rails 4, 5 reliably guide the book blocks while they are being pushed along the transport channel.

The angle-section rails 4, 5 are positively located on the book block skid plate 3 by retainers 6. The retainers also hold the rails against the vertical guides 1, 2. Spacers 6*a* are provided between the retainers 6 and the rails 4, 5 so as to facilitate the vertical movement of the skid plate 3 relative to the lateral guides. The retainers 6 engage the support fingers 3*a* in such a manner that movement of the vertical guides, during adjustment of the horizontal spacing therebetween, is easily accomplished.

It has been found advantageous to provide the support fingers 3*a* with entry camfers 3*b* and to provide the slats 1*a*, 2*a*, respectively of the vertical guides 1, 2, with entry-assisting angled portions as indicated at 1*b* and 2*b*.

Book blocks, standing upright and supported laterally by the guides 1, 2, are caused to slide along the book block skid plate 3 as a result of the pushing action of a conveyor system, indicated generally at 7, which includes drive chains 7*a* and pusher rods 8. The conveyor is caused to circulate on an endless path by an appropriate drive means. The pusher rods 8, which are coupled to the chains 7*a* at uniform intervals, extend outwardly into the transport channel. In order to permit the pusher rods 8 to extend into the transport channel from one side, the height of the vertical guide 2 is reduced relative to that of vertical guide 1. A defined space is thus created between the vertical guide 2 and an upper guide strip 9 which is aligned therewith.

The conveyor system 7, with it travelling pusher rods 8, may be adjusted vertically as indicated by a double-ended arrow. The means by which this vertical adjustment may be accomplished has not been shown in the interest of facilitating understanding of the invention. The vertical adjustability of the conveyor system ensures that the pusher rods will engage the book blocks being transported at a point which excludes the possibility of the generation of tilting moments. In accordance with the preferred embodiment, the vertical adjustment of the conveyor system and the book block skid plate 3 originates from a common adjusting device thereby ensuring that the pusher elements 8 will be automatically set to the proper height relative to the book block being transported.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A book block transport channel comprising:

a pair of oppositely disposed lateral guide means, said lateral guide means defining a pair of generally parallel side walls, said lateral guide means being relatively adjustable to vary the spacing therebetween to thereby vary the channel width, said lateral guide means each including a guide member having a plurality of elongated parallel slots;

a skid plate, said skid plate being disposed between said guide means and defining a floor of the transport channel, the floor being oriented generally transversely with respect to the channel side walls, said skid plate being adjustable relative to said lateral guide means to vary the depth of the transport channel;

a plurality of support fingers extending outwardly from each of a pair of opposite sides of said skid plate to engage respective of said guide member slots, said support fingers defining a discontinuous extension of said channel floor; and a pair of guide rails, said rails respectively being disposed at the junction of a said slotted guide member and said floor, said guide rails each extending in a first direction to bridge at least a portion of the space between adjacent of said support fingers and extending in a second direction to bridge a portion of the guide member slots which is adjacent to floor.

2. The apparatus of claim 1 wherein said guide rails are substantially coextensive in length with said slotted guide members.

3. The apparatus of claim 1 wherein each of said guide rails is a generally L-shaped member, said L-shaped members being disposed so as to be oppositely facing in the transport channel.

4. The apparatus of claim 1 further comprising:

means for coupling said guide rails to said support fingers and to said lateral guide means, said coupling means permitting movement of said support fingers relative to said slots in a pair of mutually orthogonal directions whereby the width and depth of the transport channel may be varied.

5. The apparatus of claim 1 wherein said support fingers are provided, on edge portions thereof which face opposite to the direction of book block movement, with contoured surface portions.

6. The apparatus of claim I wherein the slotted guide members include parallel slats which define said elongated slots, and wherein said slats are provided, at the edge portion thereof which face oppositely with respect to the direction of book block movement, with entry-assisting angled portions.

7. The apparatus of claim 1 further comprising:

means for causing book blocks to move along the transport channel, said motion causing means comprising pusher rods which extend into the channel.

8. The apparatus of claim 7 wherein the height of a first of said slotted guide members is reduced with respect to that of the other of said guide members to thereby defining an opening through which said pusher rods extend into the transport channel.

9. The apparatus of claim 7 wherein the position of said means for causing book block movement is adjustable.

10. The apparatus of claim 9 wherein the position of said means for causing book block movement and the position of said skid plate are simultaneously adjustable.

11. The apparatus of claim 4 wherein each of said guide rails is a generally L-shaped member, said L-shaped members being disposed so as to be oppositely facing in the transport channel.

12. The apparatus of claim 4 further comprising:

means for coupling said guide rails to said support fingers and to said lateral guide means, said coupling means permitting movement of said support fingers relative to said slots in a pair of mutually orthogonal directions whereby the width and depth of the transport channel may be varied.

13. The apparatus of claim 11 further comprising:

means for coupling said guide rails to said support fingers and to said lateral guide means, said coupling means permitting movement of said support fingers relative to said slots in a pair of mutually orthogonal directions whereby the width and depth of the transport channel may be varied.

14. The apparatus of claim 4 wherein the slotted guide members include parallel slats which define said elongated slots, and wherein said slats are provided, at the edge portion thereof which face oppositely with respect to the direction of book block movement, with entry-assisting angled portions.

15. The apparatus of claim 4 further comprising:

means for causing book blocks to move along the transport channel, said motion causing means comprising pusher rods which extend into the channel.

16. The apparatus of claim 15 wherein the position of said means for causing book block movement is adjustable.

17. The apparatus of claim 16 wherein the height of a first of said slotted guide members is reduced with respect to that of the other of said guide members to thereby defining an opening through which said pusher rods extend into the transport channel.

18. The apparatus of claim 17 wherein the slotted guide members include parallel slats which define said elongated slots, and wherein said slats are provided, at the edge portion thereof which face oppositely with respect to the direction of book block movement, with entry-assisting angled portions.

19. The apparatus of claim 18 wherein each of said guide rails is a generally L-shaped member, said L-shaped members being disposed so as to be oppositely facing in the transport channel.

20. The apparatus of claim 1 wherein said guide rails are substantially coextensive in length with said slotted guide members.

* * * * *